UNITED STATES PATENT OFFICE.

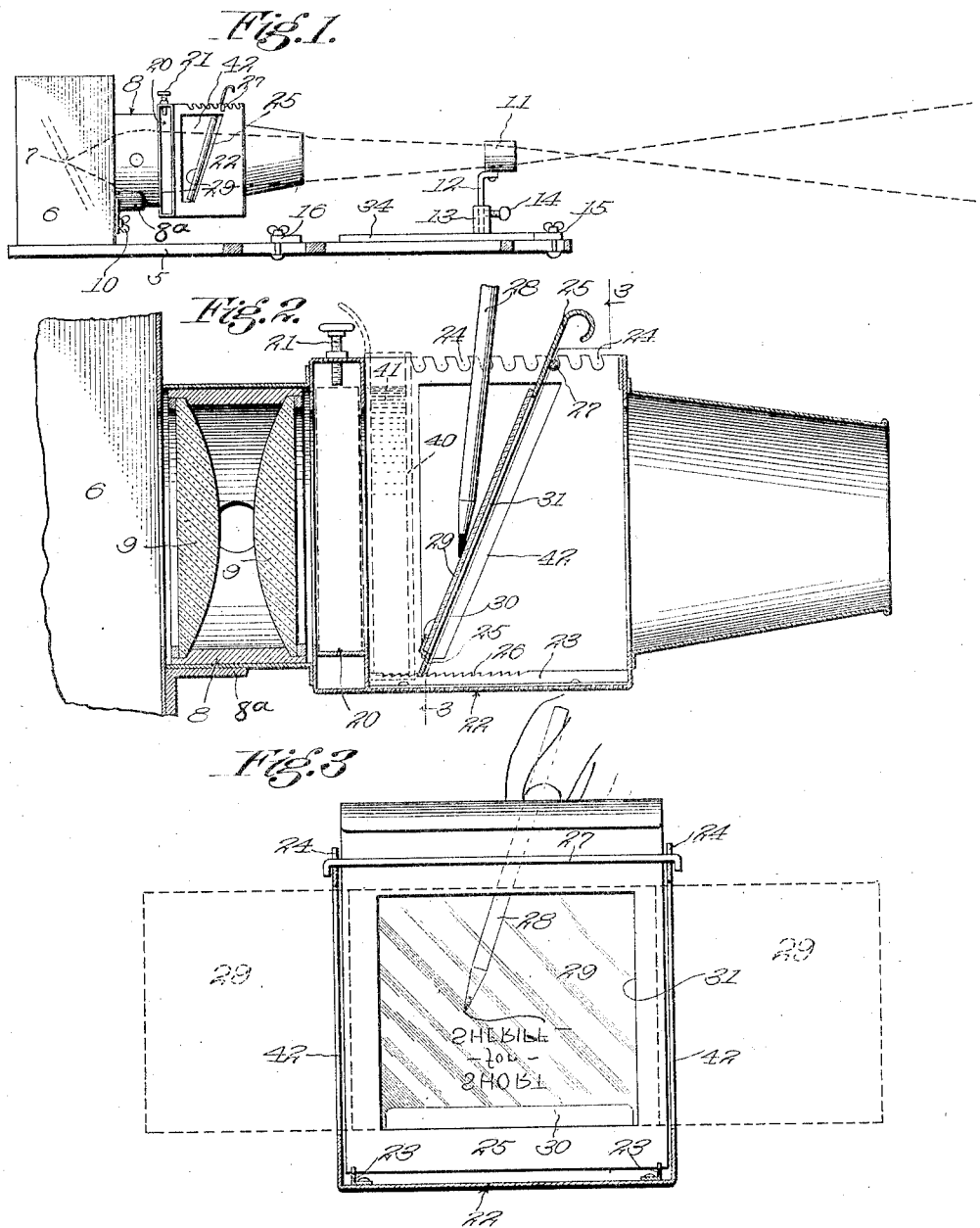

NATHANIEL W. DEXTER AND WARREN B. MATHER, OF LOS ANGELES, CALIFORNIA, ASSIGNORS TO UNITED STATES ELECTROGRAPHIC COMPANY, A CORPORATION OF NEVADA.

PROJECTION APPARATUS.

1,009,897.

Specification of Letters Patent. Patented Nov. 28, 1911.

Application filed March 27, 1911. Serial No. 617,079.

*To all whom it may concern:*

Be it known that we, NATHANIEL W. DEXTER and WARREN B. MATHER, both citizens of the United States, residing at Los Angeles, in the county of Los Angeles and State of California, have invented new and useful Improvements in Projection Apparatus, of which the following is a specification.

This invention relates to improvements in apparatus for the projection of pictures, writings, etc.; and the invention consists particularly in the provision of means whereby writings, drawings, etc., can be enlarged and projected upon a screen so that they can be viewed by a large audience during the process of making.

The distinguishing feature of our invention is the provision of a glass, or other transparent plate, placed in the beam of light projected and in such a position with relation to the apparatus that it can be easily written or drawn upon with the aid of a suitable pencil or other means. At present a pencil known as a "grease pencil" is used, this being the only successful article for marking on glass of which we are aware; but other media are not thus excluded from the scope of our invention. The glass plate is placed on an adjustable holder, the glass being easily accessible to the operator from above. The plate is placed directly in front of the usual slide holding member, none of the ordinary features of the projection lantern being thereby changed in the least particular. As the slide holder and glass panel are at different places with respect to the focus of the light passing through the condenser, it is necessary to change the position of the objective for the clear projection of the representations on the slide and on the glass panel. Stops are provided so that the objective may be moved quickly and accurately to each focal position, so that a change from the projection of matter on a slide to matter on the glass plate can be effected quickly. However, the distance between the ordinary slide and the glass plate is small and it is possible, with a small amount of indistinctness, to simultaneously project matter on both slide and plate. In this way novel effects are obtained.

In the accompanying drawings: Figure 1 is an elevation showing the general arrangement of a projection lantern equipped with our improvement, and showing the path of a set of rays through the apparatus. Fig. 2 is an enlarged longitudinal section showing the construction of our invention and of the parts of the projection lantern immediately adjacent thereto. Fig. 3 is a cross section taken on line 3—3 of Fig. 2.

In the drawings 5 designates a base board on which the apparatus is mounted, box 6, which holds the light 7, being mounted directly on base 5. Condenser 8 is secured to box 6 by means of a small bracket 8ª and thumb nut 10, the whole forward portion of the apparatus being thus removable from box 6. Condenser 8 contains the usual set of condensing lenses 9, which are shown in the present case as plano-convex. The path of rays from light 7 through this condenser is generally indicated in Fig. 1, the rays impinging on the lenses being thrown through the forward portion of the apparatus and condensed toward objective 11. Objective 11 refracts these rays in the ordinary manner to form a real image at some point at the right in Fig. 1, the rays crossing at a point some distance in front of objective 11 so that the image formed is reversed from the representation put in the path of the rays between the condenser and the objective. The objective is mounted on a rod 12 fitted into socket 13 and held in place by a thumb screw 14 so that the objective may be adjusted vertically. Socket 13 is mounted on a sliding board 34 which may be moved between two stops 15 and 16. Both of these stops are adjustable in position and are set at points so that the objective is in proper position to throw a clear image of the matter either on a slide or on the glass plate on a screen to the right, and not shown in Fig. 1. With the exception of the stops for the objective adjustment, the above described apparatus is more or less typical of the arrangement now in general use. Our invention is not restricted to combination with this specific form, it being capable of use on any of the various forms of projection apparatus now in use.

Immediately in front of condenser 8 is located slide receptacle 20. This receptacle is of ordinary construction except that we have shown a thumb screw 21 for holding the slide in place instead of the usual spring. Forward of receptacle 20 an open topped box 22 is arranged. This box is about the proportions shown in Figs. 2 and 3 and is provided with rack bars 23 on its bottom and with notches 24 in the upper edges of its two opposite side walls. Glass plate holder 25 is adapted to have its lower edge rest in notches 26 of rack bars 23 and to rest against a bar 27 placed across the upper end of the box in notches 24. By means of this arrangement the position of the glass panel holder may be changed to suit any requirements. For average use we place the holder in about the position shown so that the end of pencil 28 can easily reach glass plate 29 held in the holder. The glass plate simply rests against the holder in a clip 30 at the lower edge of opening 31 in the holder.

The operator holds the pencil in some position such as that shown and writes on the glass plate in a natural manner as it appears to him looking down upon the plate while writing or drawing. The angular position of the plate renders the work easy, it being possible to draw or write anything on the glass plate that can be done on a surface resting horizontally before the worker. As shown in Fig. 3, writing which appears normally to the operator looking down upon the rear surface of the glass, appears reversed in both directions when viewed from the front. As the projection reverses the showing in both directions, the writing is thrown upon the screen in a normal position as viewed from the side on which the projection apparatus is located. Apertures 42 are provided in the sides of box 22 so that a long glass panel may be used and moved horizontally into the field of light. On such a long plate, indicated in dotted lines in Fig. 3, writing or drawing may be continued from one end to the other by merely sliding the plate along as the work progresses. This method has certain advantages. For instance, a long panorama may be made and shown with ease.

In addition to the glass plate we sometimes place a transparent box 40 in the path of the rays directly between the condenser and the glass plate. This box is designed to hold a liquid 41, such as water, and to thereby prevent any intense heat from reaching the glass plate and the hand of the operator. This box may be filled with a colored liquid or it may be filled with various colored liquids. One of the main uses which we put this box to is a novel representation of intermingling colors which seem to float around and into each other. By placing a heavy liquid within a lighter liquid of another color, the heavy liquid will sink in the box and therefore appear to rise in the projection on the screen. As the movement of these liquids is caused by gravity, exact simulations of clouds of smoke moving in the atmosphere can be made. By injecting a quantity of appropriately colored fluid behind a stationary representation of a volcano, the volcano being pictured on the slide, a realistic representation of an eruption may be made. Such representations as these may be carried on in combination with sketches and writings made on the glass plate, both representations being simultaneously projected into the same field of view.

Our invention consists primarily in the provision of means for projecting writings and drawings and other representations while being made, placed directly in the beam of light projected from the projection apparatus. The apparatus is applicable to any form of representation, as is illustrated by the use of the two distinct forms of representation before described. With this in view the following claims are intended to broadly cover any device capable of being used for the projection of formative representations.

Having described our invention, we claim:

1. A projection apparatus, comprising a source of light, a condenser in front of the source of light, a box arranged in front of the condenser, a transparent plate mounted in the box and inclined upwardly and away from the condenser so as to allow free access to its surface toward the condenser, and an objective arranged in front of the box.

2. A projection apparatus, comprising a source of light, a supporting member, a transparent plate mounted on the supporting member in the path of approximately horizontal rays from the source of light, the plate being inclined upwardly and away from the source of light so as to render its surface toward the source of light accessible from above.

3. A projection apparatus, comprising a source of light, a housing therefor, a condenser secured to the housing and adapted to condense light rays from the source of light, a box secured to the condenser and having openings through which the condensed beam of light passes, a transparent plate, adjustable supporting means in the box adapted to support the plate in an inclined position in the path of the beam of light, and an objective arranged to intercept the beam of light beyond the box.

4. A projection apparatus, comprising a base, a source of light mounted on the base, a condenser mounted on the base and adapted to condense and project a horizontal beam of light, a slide carrier receptacle arranged in front of the condenser, a transparent plate means for supporting the plate in front of the slide carrier receptacle in the path of the beam of light, and an objective adjustably mounted on the base to be moved between fixed limits in the path of the beam of light.

In witness that we claim the foregoing we have hereunto subscribed our names this 20th day of March, 1911.

NATHANIEL W. DEXTER.
WARREN B. MATHER.

Witnesses:
  ELWOOD H. BARKELEW,
  JAMES T. BARKELEW.